US010951155B2

(12) United States Patent
Tokimasa et al.

(10) Patent No.: US 10,951,155 B2
(45) Date of Patent: Mar. 16, 2021

(54) TEMPERATURE PREDICTION DEVICE, COMPRESSOR WITH MAGNETIC BEARING MOUNTED THEREON, TEMPERATURE PREDICTION METHOD AND PROGRAM

(71) Applicant: MITSUBISHI HEAVY INDUSTRIES THERMAL SYSTEMS, LTD., Tokyo (JP)

(72) Inventors: Yasunori Tokimasa, Tokyo (JP); Yasushi Hasegawa, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 62 days.

(21) Appl. No.: 16/488,178

(22) PCT Filed: Feb. 28, 2018

(86) PCT No.: PCT/JP2018/007387
§ 371 (c)(1),
(2) Date: Aug. 22, 2019

(87) PCT Pub. No.: WO2018/159645
PCT Pub. Date: Sep. 7, 2018

(65) Prior Publication Data
US 2020/0044597 A1 Feb. 6, 2020

(30) Foreign Application Priority Data
Feb. 28, 2017 (JP) .............................. JP2017-036342

(51) Int. Cl.
*H02P 29/64* (2016.01)
*H02K 11/25* (2016.01)
(Continued)

(52) U.S. Cl.
CPC ............ *H02P 29/64* (2016.02); *F16C 32/048* (2013.01); *F25B 31/026* (2013.01); *H02K 7/09* (2013.01); *H02K 11/25* (2016.01)

(58) Field of Classification Search
CPC .......... H02P 29/64; H02K 11/25; H02K 7/09; F16C 32/048; F25B 31/026
(Continued)

(56) References Cited

U.S. PATENT DOCUMENTS

2009/0136335 A1* 5/2009 Nakazeki ................ F25B 9/004
415/13
2014/0324265 A1 10/2014 Ozaki
(Continued)

FOREIGN PATENT DOCUMENTS

CN 101248317 A 8/2008
CN 103947103 A 7/2014
(Continued)

OTHER PUBLICATIONS

International Search Report for International Application No. PCT/JP2018/007387 dated May 29, 2018, with English translation.
Written Opinion of the International Searching Authority for International Application No. PCT/JP2018/007387, dated May 29, 2018, with English translation.

*Primary Examiner* — Jorge L Carrasquillo
(74) *Attorney, Agent, or Firm* — Birch, Stewart, Kolasch & Birch, LLP.

(57) ABSTRACT

A temperature prediction device includes an application voltage specifying unit which specifics a voltage value applied to an electromagnetic coil based on a distance from a distance detection unit provided in the electromagnetic coil to an output shaft, a coil current detection unit which detects a current value flowing when a voltage is applied to the electromagnetic coil on the basis of the voltage value specified by the application voltage specifying unit, and a coil temperature estimation unit which estimates a tempera- (Continued)

ture of the electromagnetic coil on the basis of the voltage value specified by the application voltage specifying unit, the current value detected by the coil current detection unit, and a relational expression between the voltage value applied to the electromagnetic coil, the current value flowing when a voltage is applied to the electromagnet coil on the basis of the voltage value applied to the electromagnetic coil, and the temperature of the electromagnetic coil.

5 Claims, 6 Drawing Sheets

(51) Int. Cl.
  *H02K 7/09* (2006.01)
  *F25B 31/02* (2006.01)
  *F16C 32/04* (2006.01)
(58) Field of Classification Search
  USPC .......................................... 318/490
  See application file for complete search history.

(56) References Cited

U.S. PATENT DOCUMENTS

2015/0372627 A1    12/2015   Kim
2016/0265545 A1     9/2016   Ueda et al.
2018/0058958 A1*   3/2018   Lu .................... G01D 5/2046

FOREIGN PATENT DOCUMENTS

| | | | | |
|---|---|---|---|---|
| CN | 105227030 A | 1/2016 | | |
| FR | 2 892 780 A1 | 5/2007 | | |
| FR | 2892780 A1 * | 5/2007 | ............ | F16C 41/004 |
| JP | 2004-208453 A | 7/2004 | | |
| JP | 2005-240952 A | 9/2005 | | |
| JP | 2008-157439 A | 7/2008 | | |
| JP | 2010-148322 A | 7/2010 | | |
| JP | 2010148322 A * | 7/2010 | | |
| JP | 2015-94259 A | 5/2015 | | |
| JP | 2016-220338 A | 12/2016 | | |

* cited by examiner

… (1)

TEMPERATURE PREDICTION DEVICE, COMPRESSOR WITH MAGNETIC BEARING MOUNTED THEREON, TEMPERATURE PREDICTION METHOD AND PROGRAM

TECHNICAL FIELD

The present invention relates to a temperature prediction device, a compressor with a magnetic bearing mounted thereon, a temperature prediction method, and a program.

Priority is claimed on Japanese Patent Application No. 2017-036342, filed Feb. 28, 2017, the content of which is incorporated herein by reference.

BACKGROUND ART

Compressors with a magnetic bearing mounted thereon may be used in turbo refrigerators and the like. In a compressor with a magnetic bearing mounted thereon, a rotary shaft is controlled such that it does not come into contact with a bearing by using a suction force due to the magnetism generated by applying a current to an electromagnetic coil.

Patent Literature 1 discloses a technique for adjusting an excitation current applied to an electromagnet on the basis of the temperature of a surface of a rotary shaft by using a temperature sensor, as the related art.

CITATION LIST

Patent Literature

Patent Literature 1

Japanese Unexamined Patent Application, First Publication No. 2008-157439

SUMMARY OF INVENTION

Technical Problem

Incidentally, when an excess current flows to an electromagnetic coil of a compressor with a magnetic bearing mounted thereon, there is a likelihood that a defect will occur in the electromagnetic coil.

For this reason, a technique for easily determining whether or not an excess current is flowing to an electromagnetic coil of a compressor with a magnetic bearing mounted thereon is required.

An object of the present invention is to provide a temperature prediction device, a compressor with a magnetic bearing mounted thereon, a temperature prediction method, and a program which are capable of resolving the above-described problem.

Solution to Problem

According to a first aspect of the present invention, a temperature prediction device includes an application voltage specifying unit configured to specify a voltage value applied to an electromagnetic coil based on a distance from a distance detection unit provided in the electromagnetic coil to an output shaft, a coil current detection unit configured to detect a current value flowing when a voltage is applied to the electromagnetic coil on the basis of the voltage value specified by the application voltage specifying unit, and a coil temperature estimation unit configured to estimate a temperature of the electromagnetic coil on the basis of the voltage value specified by the application voltage specifying unit, the current value detected by the coil current detection unit, and a relational expression between the voltage value applied to the electromagnetic coil, the current value flowing to the electromagnetic coil in accordance with the voltage value applied to the electromagnetic coil, and the temperature of the electromagnetic coil.

According to a second aspect of the present invention, in the temperature prediction device according to the first aspect, the application voltage specifying unit may specify a measured value of a voltage applied to the electromagnetic coil on the basis of the distance from the distance detection unit provided in the electromagnetic coil to the output shaft, the coil current detection unit may detect a current value flowing when a voltage is applied to the electromagnetic coil on the basis of the measured value of the voltage specified by the application voltage specifying unit, and the coil temperature estimation unit may estimate a temperature of the electromagnetic coil on the basis of the measured value of the voltage specified by the application voltage specifying unit, the current value detected by the coil current detection unit, and the relational expression between the voltage value applied to the electromagnetic coil, the current value flowing to the electromagnetic coil in accordance with the voltage value applied to the electromagnetic coil, and the temperature of the electromagnetic coil.

According to a third aspect of the present invention, in the temperature prediction device according to the first aspect, the application voltage specifying unit may specify a command value of a Voltage applied to the electromagnetic coil on the basis of the distance from the distance detection unit provided in the electromagnetic coil to the output shaft, the coil current detection unit may detect a current value flowing when a voltage is applied to the electromagnetic coil on the basis of the command value of the voltage specified by the application voltage specifying unit, and the coil temperature estimation unit may estimate a temperature of the electromagnetic coil on the basis of the command value of the voltage specified by the application voltage specifying unit, the current value detected by the coil current detection unit, and a relational expression between the voltage value applied to the electromagnetic coil, the current value flowing to the electromagnetic coil in accordance with the voltage value applied to the electromagnetic coil, and the temperature of the electromagnetic coil.

According to a fourth aspect of the present invention, in the temperature prediction device according to any one of the first to third aspects, when the voltage value is set to be E, the current value is set to be 1, the temperature of the electromagnetic coil is set to be T, a resistance of the electromagnetic coil is set to be R, a resistance of the electromagnetic coil at a temperature T0 of the electromagnetic coil which is acquired in advance is set to be R0, and a factor is set to be $\alpha$, the relational expression may be an expression expressed as follows.

$$T = T0 + \frac{1}{\alpha}\left(\frac{E}{IR0} - 1\right) \quad \text{[Math. 1]}$$

According to a fifth aspect of the present invention, a compressor with a magnetic bearing mounted thereon includes the temperature prediction device according to any one of the first to fourth aspects, and a motor which includes an electromagnetic coil which is a target for temperature prediction to be performed by the temperature prediction device.

According to a sixth aspect of the present invention, a temperature prediction method includes specifying a voltage value applied to an electromagnetic coil based on a distance from a distance detection unit provided in the electromagnetic coil to an output shaft, detecting a current value flowing when a voltage is applied to the electromagnetic coil on the basis of the specified voltage value, and estimating a temperature of the electromagnetic coil on the basis of the specified voltage value, the detected current value, and a relational expression between the voltage value applied to the electromagnetic coil, the current value flowing to the electromagnetic coil in accordance with the voltage value applied to the electromagnetic coil, and the temperature of the electromagnetic coil.

According to a ninth aspect of the present invention, a program causes a computer to specify a voltage value applied to an electromagnetic coil based on a distance from a distance detection unit provided in the electromagnetic coil to an output shaft, detect a current value flowing when a voltage is applied to the electromagnetic coil on the basis of the specified voltage value, and estimate a temperature of the electromagnetic coil on the basis of the specified voltage value, the detected current value, and a relational expression between the voltage value applied to the electromagnetic coil, the current value flowing to the electromagnetic coil in accordance with the voltage value applied to the electromagnetic coil, and the temperature of the electromagnetic coil.

Advantageous Effects of Invention

According to a temperature prediction device according to an embodiment of the present invention, it is possible to easily determine whether or not an excess current is flowing to an electromagnetic coil of a compressor with a magnetic bearing mounted thereon.

DESCRIPTION OF EMBODIMENTS

First Embodiment

Hereinafter, embodiments will be described in detail with reference to the accompanying drawings.

A configuration of a compressor 1 with a magnetic bearing mounted thereon according to a first embodiment of the present invention will be described.

The compressor 1 with a magnetic bearing mounted thereon according to the first embodiment of the present invention is used for a turbo refrigerator which is variously used in a large air conditioner in a building, a cooling facility in a chemical plant, and the like.

Figure 1:
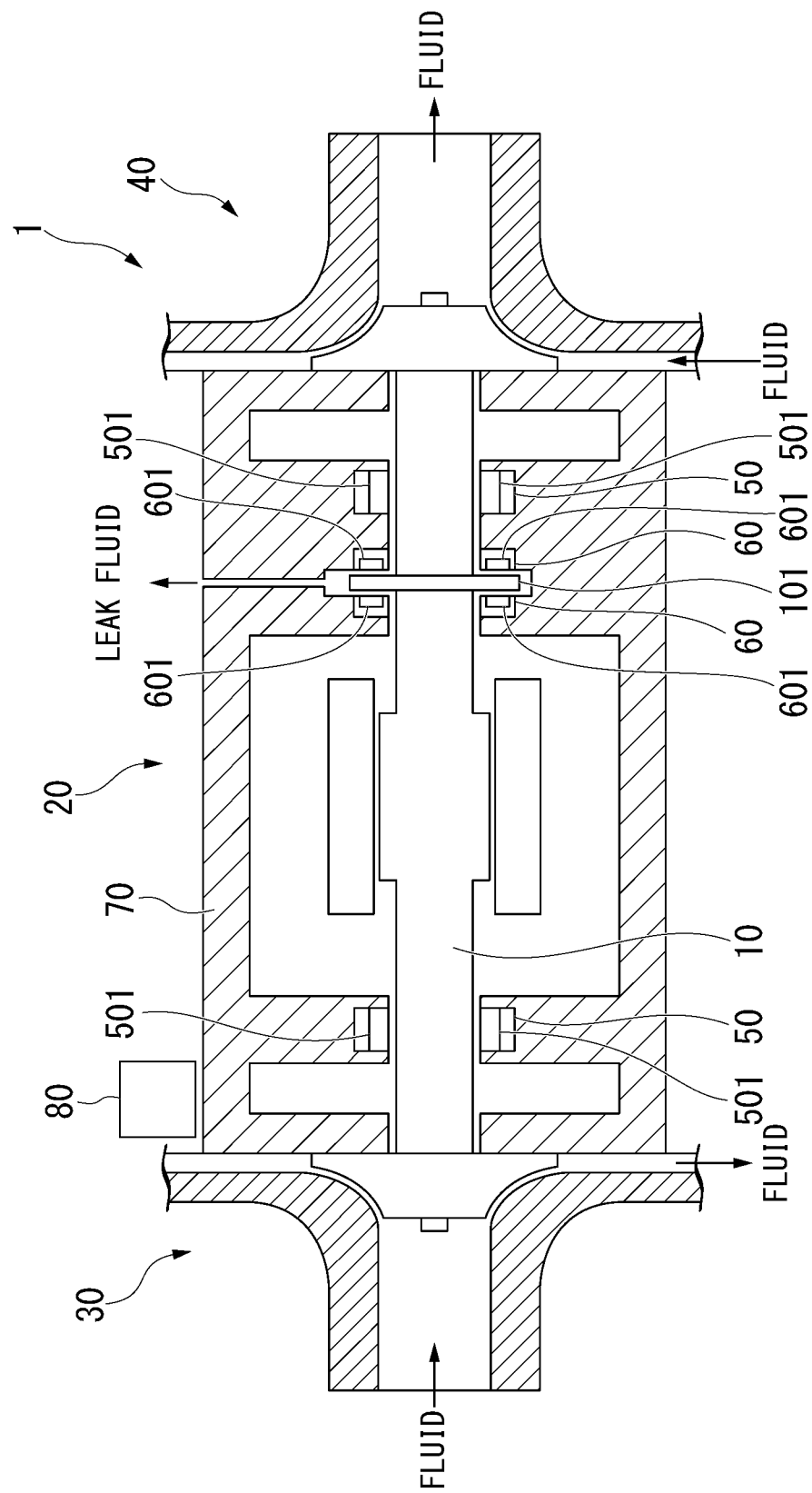
FIG. 1 is a diagram showing a configuration of a compressor with a magnetic bearing mounted thereon according to a first embodiment of the present invention.

The compressor 1 with a magnetic bearing mounted thereon includes an output shaft 10, a motor 20, a compressor main body 30, an expander 40, a radial magnetic bearing 50, a thrust magnetic bearing 60, a casing 70, and a temperature prediction device 80 as shown in FIG. 1.

The output shaft 10 is an output shaft of the motor 20.

As shown in FIG. 1, the motor 20 is provided between the compressor main body 30 and the expander 40.

The compressor main body 30 is connected to the output shaft 10 and is configured to compress a fluid when the motor 20 is rotated.

The expander 40 is connected to the output shaft 10 and is configured to expand a fluid and recover motive power for the output shaft 10 as rotary power of the motor 20 from the fluid.

The output shaft 10 is supported in a non-contact manner by the radial magnetic bearing 50 and the thrust magnetic bearing 60 which are provided between the compressor main body 30 and the expander 40.

The radial magnetic bearing 50 is provided on both sides of the motor 20 in an axial direction of the output shaft 10. The radial magnetic bearing 50 includes a plurality of electromagnetic coils 501. The radial magnetic bearing 50 raises the output shaft 10 in response to a rotor load such as gravity or an aerodynamic force (for example, a thrust force due to a gas) by using a magnetic force (for example, a suction force due to magnetism) when a current flows to each of the plurality of electromagnetic coils 501. Thereby, rubbing, abrasion, and the like are reduced, and various advantages such as a long life span, easy maintenance, low noise, and low vibration of the compressor 1 with a magnetic bearing mounted thereon, high-speed rotation of the motor 20, and a reduction in a rotational loss are obtained.

The thrust magnetic bearing 60 is provided (between the motor 20 and the expander 40 in a case of the compressor 1 with a magnetic bearing mounted thereon shown in FIG. 1) on one side of the motor 20 in the axial direction of the output shaft 10. The thrust magnetic bearing 60 includes a plurality of electromagnetic coils 601. A gap is generated between the thrust magnetic bearing 60 and an axial rotor disk 101 provided in the output shaft 10 due to a magnetic force (for example, a suction force due to magnetism) when a current flows to each of the plurality of electromagnetic coils 601. Thereby, it is possible to counter an aerodynamic force acting in the axial direction of the output shaft 10 when the output shaft 10 is rotated, rubbing, abrasion, and the like are reduced, and various advantages such as a long life span, easy maintenance, low noise, and low vibration of the compressor 1 with a magnetic bearing mounted thereon, high-speed rotation of the motor 20, and a reduction in a rotational loss are obtained.

The casing 70 accommodates the motor 20, the compressor main body 30, the expander 40, the radial magnetic bearing 50, and the thrust magnetic bearing 60.

Figure 2:
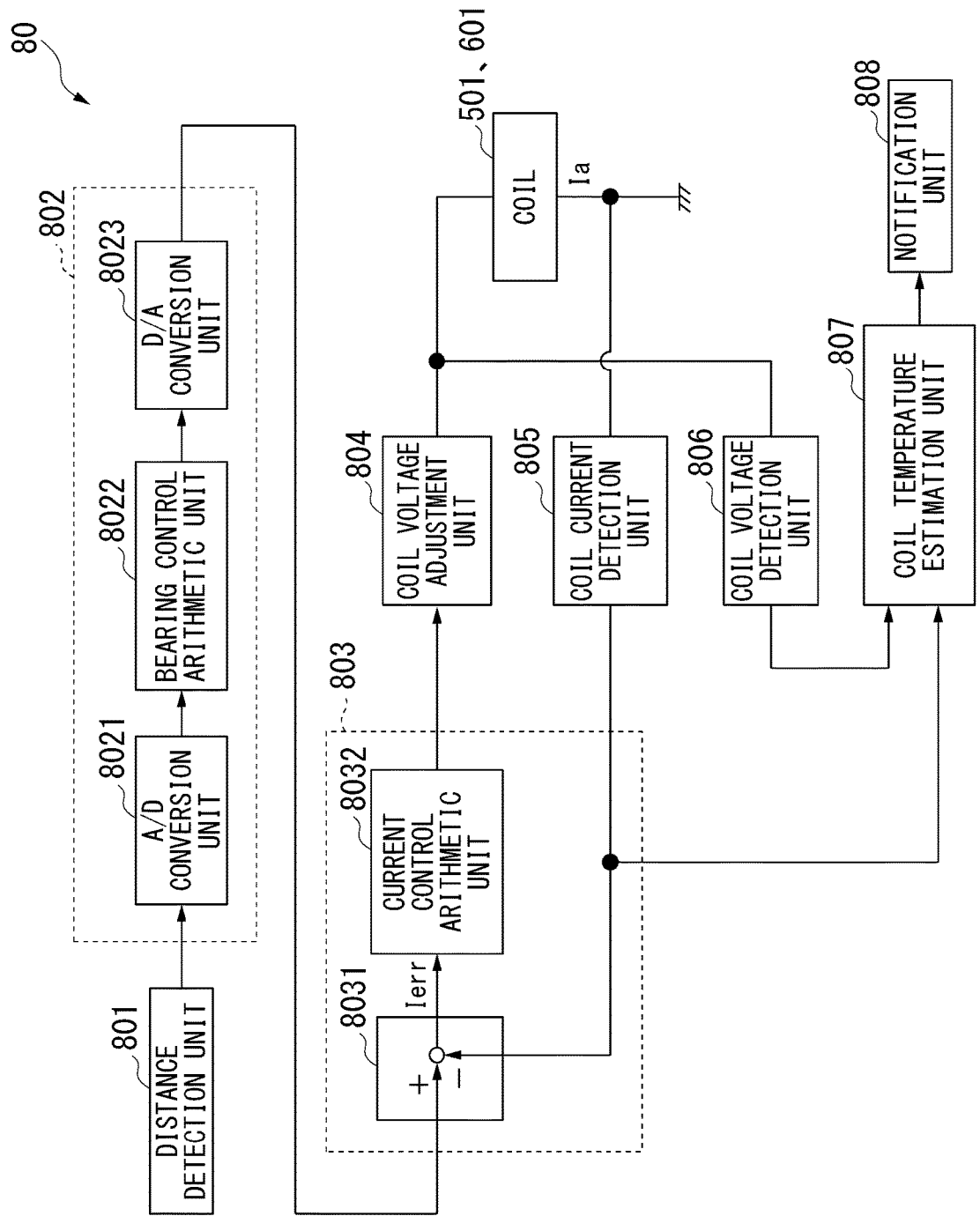
FIG. 2 is a diagram showing a configuration of a temperature prediction device according to the first embodiment of the present invention.

As shown in FIG. 1, the temperature prediction device 80 is provided, for example, on the outer surface of the casing 70. As shown in FIG. 2, the temperature prediction device 80 includes a distance detection unit 801, a magnetic bearing controller 802, a coil current controller 803, a coil voltage adjustment unit 804 (application voltage specifying unit), a coil current detection unit 805, a coil voltage detection unit 806, a coil temperature estimation unit 807, and a notification unit 808. In addition, the distance detection unit 801, the magnetic bearing controller 802, the coil current controller 803, the coil voltage adjustment unit 804, and the coil current detection unit 805 are functional units which are also used for general magnetic bearing control.

A plurality of distance detection units 801 are provided in the temperature prediction device 80. The distance detection unit 801 generates an analog signal based on the position of the output shaft 10. Specifically, the distance detection unit 801 is provided, for example, at a predetermined position on each of the electromagnetic coil 501 and electromagnetic coil 601 and outputs an axis position signal indicating a distance from the distance detection unit 801 to the output shaft 10.

The magnetic bearing controller 802 includes an analog to digital (A/D) conversion unit 8021, a bearing control arithmetic unit 8022, and a digital to analog (D/A) conversion unit 8023.

The A/D conversion unit 8021 converts an axis position signal generated by each of the distance detection units 801 into a digital signal through parallel processing.

The bearing control arithmetic unit 8022 performs filter arithmetic operation, arithmetic operation for proportional-integral-differential (PID) control, and the like on a digital signal for each of the distance detection units 801 provided in the same bearing (the radial magnetic bearing 50 and the thrust magnetic bearing 60) among digital signals converted by the A/D conversion unit 8021 to generate a digital current command value for each of the electromagnetic coils 501 and the electromagnetic coils 601 provided with the distance detection units 801.

Specifically, the bearing control arithmetic unit 8022 generates a digital current command value for increasing a suction force due to magnetism as a distance from the distance detection unit 801 to the output shaft 10 which is indicated by a digital signal increases and reducing a suction force due to magnetism as a distance from the distance detection unit 801 to the output shaft 10 which is indicated by a digital signal decreases. In addition, a specific value of the digital current command value is stored in a storage unit by performing experiment and simulation in advance and specifying a relationship between a distance from the distance detection unit 801 to the output shaft 10 and a digital current command value (that is, equivalent to the magnitude of a suction force). In addition, the bearing control arithmetic unit 8022 may generate a digital current command value by specifying a digital current command value corresponding to a distance from the distance detection unit 801 to the output shaft 10 which is indicated by a digital signal in the storage unit and reading out the specified digital current command value from the storage unit. In addition, a relational expression indicating a relationship between the distance from the distance detection unit 801 to the output shaft 10 and the digital current command value is stored in the storage unit, and the bearing control arithmetic unit 8022 may generate a digital current command value by reading out the digital current command value corresponding to the distance from the distance detection unit 801 to the output shaft 10, which is indicated by a digital signal, from the storage unit.

The D/A conversion unit 8023 converts the digital current command value generated by the bearing control arithmetic unit 8022 into an analog current command value which is an analog signal.

The coil current controller 803 includes a signal synthesis unit 8031 and a current control, arithmetic unit 8032 (application voltage specifying unit).

The signal synthesis unit 8031 specifies an error current value Ierr by subtracting a current value of a coil current Ia detected by a coil current detection unit 805 to be described later from an analog current command value converted by the D/A conversion unit 8023.

The current control arithmetic unit 8032 performs filter arithmetic operation, subtraction for PID control, and the like on the error current value Ierr specified by the signal synthesis unit 8031 to generate an analog voltage command value for reducing an error current value Ierr for each of the electromagnetic coils 501 and the electromagnetic coils 601 provided with the distance detection units 801. That is, the current control arithmetic unit 8032 generates an analog voltage command value applied to the electromagnetic coils 501 and the electromagnetic coils 601 so that the coil current Ia is consistent with the analog current command value.

The coil voltage adjustment unit 804 switches, that is, turns on or off a switch (for example, a transistor) on the basis of PWM control of an analog voltage command value generated by the current control arithmetic unit 8032 to generate a control voltage Ea for controlling a coil current Ia flowing through each of the electromagnetic coils 501 and 601.

A coil current Ia based on the respective control voltages Ea generated by the coil voltage adjustment unit 804 flows through each of the electromagnetic coils 501 and 601.

The coil current detection unit 805 detects the coil current Ia flowing through each of the electromagnetic coils 501 and 601.

The coil voltage detection unit 806 detects the control voltage Ea generated by the coil voltage adjustment unit 804.

The coil temperature estimation unit 807 estimates a coil temperature Tc of each of the electromagnetic coils 501 and 601 on the basis of the coil current Ia detected by the coil current detection unit 805, the control voltage Ea detected by the coil voltage detection unit 806, and a relational expression indicating a relationship between the coil current Ia, the control voltage Ea, and the coil temperature Tc of each of the electromagnetic coils 501 and 601.

Here, the relational expression indicating a relationship between the coil current Ia, the control voltage Ea, and the coil temperature Tc of each of the electromagnetic coils 501 and 601 is obtained as follows.

Expression (1) shown below is established between the coil current average value Ia and the coil voltage average value Ea.

[Math. 2]

$$Ea = Ia \times Rc \quad (1)$$

Here, Rc is a resistance value of the electromagnetic coil 501 or the electromagnetic coil 601.

In general, regarding a coil resistance, a resistance value Re increases as a coil temperature Tc becomes higher, and the coil resistance is expressed by Expression (2) shown below.

[Math. 3]

$$Rc(T) = Rc0(1 + \alpha(Tc - Tc0)) \quad (2)$$

Here, Rc0 is a resistance value of the electromagnetic coil 501 or the electromagnetic coil 601 at a coil temperature Tc0. In addition, $\alpha$ is a specific factor.

It is possible to obtain Expression (3) which is a relational expression from which the coil temperature Tc can be estimated, by using a coil current value Ia, a coil voltage value Ea, a resistance value Rc0 obtained in advance, a coil temperature Tc0, and a factor α for the above-described Expression (1) and Expression (2). In addition, there is a likelihood that each of the coil current value Ta and the coil voltage value Ea will have a peculiar value at a sampling timing (have an abnormal value due to any reason), and thus the value may be an average value such as a sampling value reversely traced back several times from the sampling timing.

[Math. 4]

$$Tc = Tc0 + \frac{1}{\alpha}\left(\frac{Ea}{IaRc0} - 1\right) \quad (3)$$

In addition, a relational expression from which the coil temperature Tc expressed by Expression (3) can be estimated may be stored in the storage unit in advance, and the coil temperature estimation unit 807 may read out the relational expression from the storage unit and use the relational expression.

The notification unit 808 outputs information based on an estimated value of the coil temperature Tc estimated by the coil temperature estimation unit 807.

Specifically, for example, in a case where a coil temperature Tc of a certain electromagnetic coil among the electromagnetic coils 501 and 601 exceeds a first temperature threshold value serving as a determination criterion for determining whether to stop operation, the notification unit 808 outputs a warning indicating that the electromagnetic coil has exceeded the first threshold value.

Further, in a case where a coil temperature Tc of a certain electromagnetic coil among the electromagnetic coils 501 and 601 exceeds the first temperature threshold value serving as a determination criterion for determining whether to stop operation, for example, the notification unit 808 may give a notification to the coil current controller 803 so as to stop the compressor 1 with a magnetic bearing mounted thereon before a defect occurs.

Further, specifically, for example, in a case where a coil temperature Tc of a certain electromagnetic coil among the electromagnetic coils 501 and 601 exceeds a second temperature threshold value serving as a determination criterion for determining whether to give a warning, the notification unit 808 may output a warning indicating that the electromagnetic coil has exceeded the second threshold value.

Further, in a case where a coil temperature Tc of a certain electromagnetic coil among the electromagnetic coils 501 and 601 exceeds the second temperature threshold value serving as a determination criterion for determining whether to give a warning, the notification unit 808 may determine that a load due to an aerodynamic force is an excess load and, for example, may give a notification to the coil current controller 803 so as to reduce an output (the amount of gas discharged), instead of giving a warning.

Thereby, the temperature prediction device 80 can protect each of the electromagnetic coils 501 and 601.

In addition, the first temperature threshold value and the second temperature threshold value may be stored in the storage unit in advance, and the notification unit 808 may read out the first temperature threshold value and the second temperature threshold value from the storage unit and use the values.

Next, processing of the compressor 1 with a magnetic bearing mounted thereon according to the first embodiment of the present invention will be described.

Figure 3:
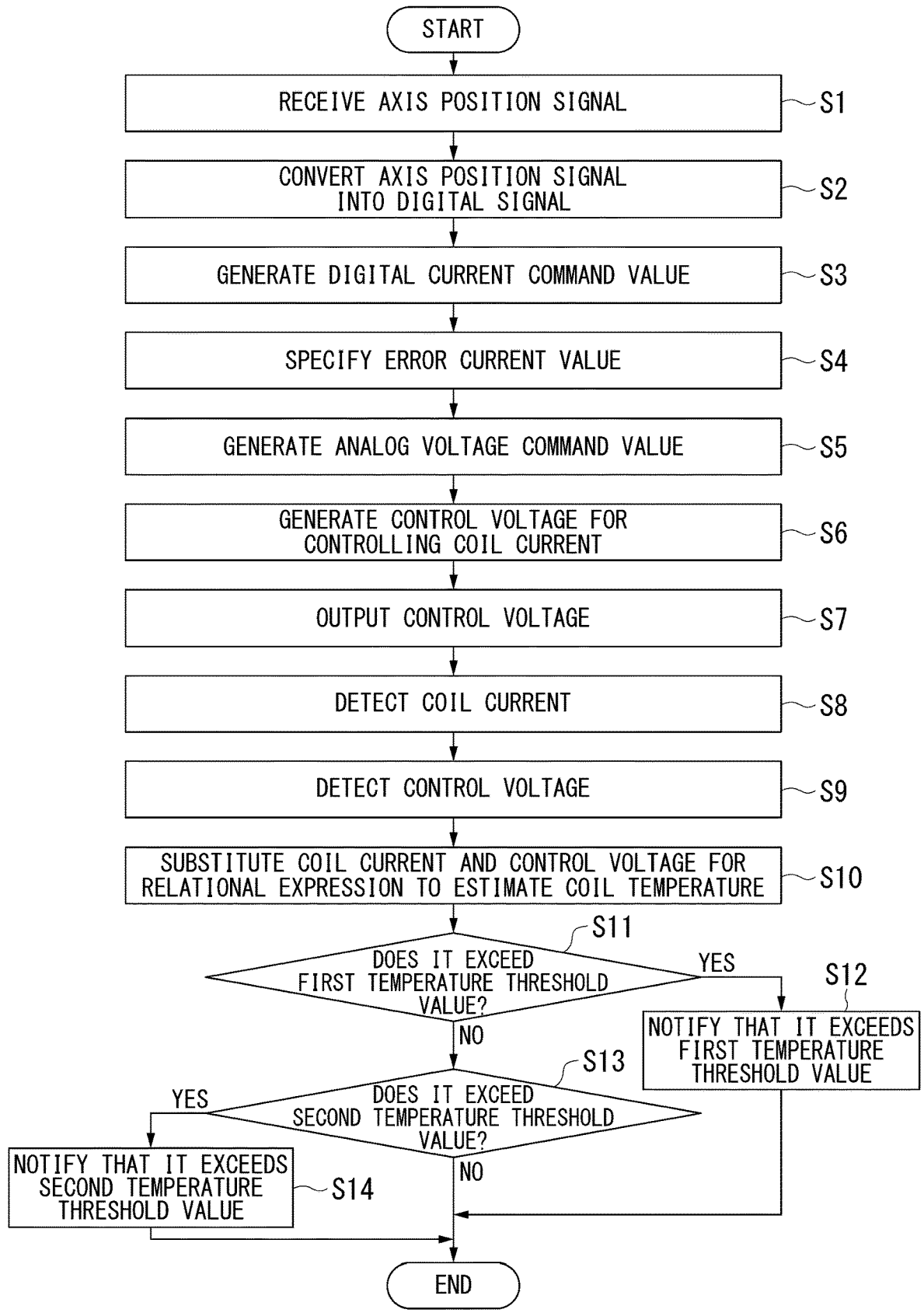
FIG. 3 is a diagram showing a processing flow of the compressor with a magnetic bearing mounted thereon according to the first embodiment of the present invention.

Here, a processing flow of the temperature prediction device 80 according to the first embodiment of the present invention shown in FIG. 3 will be described.

In addition, here, as a specific example, the electromagnetic coil 501 shown in FIG. 1 will be described as an example. However, the compressor 1 with a magnetic bearing mounted thereon also actually performs the same processing as that of the electromagnetic coil 501 described as a specific example on each of the other electromagnetic coils 501 and 601.

In the compressor 1 with a magnetic bearing mounted thereon according to the first embodiment of the present invention, the A/D conversion unit 8021 receives an axis position signal which is an analog signal from each of the distance detection units 801 provided in the electromagnetic coil 501 shown in FIG. 1 (step S1).

The A/D conversion unit 8021 converts each axis position signal received into a digital signal through parallel processing (step S2).

The A/D conversion unit 8021 outputs the converted digital signal to the bearing control arithmetic unit 8022.

The bearing control arithmetic unit 8022 receives the converted digital signal from the A/D conversion unit 8021.

The bearing control arithmetic unit 8022 performs filter arithmetic operation, arithmetic operation for PID control, and the like on the digital signal for each of the distance detection units 801 provided in the same radial magnetic bearing 50 among the received digital signals to generate a digital current command value for each of the electromagnetic coils 501 provided with the distance detection units 801 (step S3).

The bearing control arithmetic unit 8022 outputs the generated digital current command value to the D/A conversion unit 8023.

The D/A conversion unit 8023 receives the digital current command value from the bearing control arithmetic unit 8022. The D/A conversion unit 8023 converts the received digital current command value into an analog current command value.

The D/A conversion unit 8023 outputs the converted analog current command value to the signal synthesis unit 8031.

The signal synthesis unit 8031 receives the analog current command value from the D/A conversion unit 8023. In addition, the signal synthesis unit 8031 receives a current value of a coil current Ia detected by the coil current detection unit 805 from the coil current detection unit 805.

The signal synthesis unit 8031 specifies an error current value Ierr by subtracting the received current value of the coil current Ia from the received analog current command value (step S4).

The signal synthesis unit 8031 outputs the specified error current value Ierr to the current control arithmetic unit 8032.

The current control arithmetic unit 8032 receives the error current value Ierr from the signal synthesis unit 8031.

The current control arithmetic unit 8032 performs filter arithmetic operation, arithmetic operation for PID control, and the like on the received error current value Ierr to generate an analog voltage command value for reducing the error current value Ierr for each of the electromagnetic coils 501 provided with the distance detection units 801 (step S5).

The current control arithmetic unit 8032 outputs the generated analog voltage command value to the coil voltage adjustment unit 804.

The coil voltage adjustment unit 804 receives the analog voltage command value from the current control arithmetic unit 8032.

The coil voltage adjustment unit 804 switches, that is, turns on or off a switch on the basis of PWM control of the received analog voltage command value to generate a control voltage Ea for controlling a coil current Ia flowing through each of the electromagnetic coils 501 (step S6).

The coil voltage adjustment unit 804 outputs the generated control voltages Ea to the corresponding electromagnetic coils 501, respectively (step S7).

In this case, the coil current Ia based on the corresponding control voltage Ea generated by the coil voltage adjustment unit 804 flows through each of the electromagnetic coils 501.

The coil current detection unit 805 detects the coil current Ia flowing through each of the electromagnetic coils 501 (step S8).

The coil current detection unit 805 outputs a current value of each of the detected coil currents Ia to the coil temperature estimation unit 807.

The coil voltage detection unit 806 detects the control voltage Ea which is output by the coil voltage adjustment unit 804 (step S9).

The coil voltage detection unit 806 outputs a voltage value of each of the detected coil voltages Ea to the coil temperature estimation unit 807.

The coil temperature estimation unit 807 receives the voltage value of the control voltage Ea from the coil voltage adjustment unit 804. In addition, the coil temperature estimation unit 807 receives the current value of the coil current Ia from the coil current detection unit 805. In addition, the coil temperature estimation unit 807 reads out Expression (3) which is the above-described relational expression from the storage unit.

The coil temperature estimation unit 807 substitutes the coil current Ia and the control voltage Ea into Expression (3) which is the relational expression read out from the storage unit to estimate a coil temperature Tc (step S10).

The coil temperature estimation unit 807 outputs the estimated value of the coil temperature Tc to the notification unit 808.

The notification unit 808 receives the estimated value of the coil temperature Tc from the coil temperature estimation unit 807.

The notification unit 808 outputs information based on the received estimated value of the coil temperature Tc.

Specifically, for example, the notification unit 808 determines whether or not a coil temperature Tc of a certain electromagnetic coil among the electromagnetic coils 501 and 601 has exceeded a first temperature threshold value serving as a determination criterion for determining whether to stop operation (step S11).

In a case where the notification unit 808 determines that a coil temperature Tc of a certain electromagnetic coil among the electromagnetic coils 501 and 601 has exceeded the first temperature threshold value serving as a determination criterion for determining whether to stop operation (YES in step S11), the notification unit 808 outputs a warning indicating that the electromagnetic coil has exceeded the first threshold value (step S12). In addition, the notification unit 808 terminates the processing. In addition, in a case where the notification unit 808 determines that a coil temperature Tc of a certain electromagnetic coil among the electromagnetic coils 501 and 601 has exceeded the first temperature threshold value serving, as a determination criterion for determining whether to stop operation (YES in step S11), for example, the notification unit 808 may give a notification to the coil current controller 803 so as to stop the compressor 1 with a magnetic bearing mounted thereon before a defect occurs.

Further, in a case where the notification unit 808 determines that a coil temperature Tc of a certain electromagnetic coil among the electromagnetic coils 501 and 601 has not exceeded the first temperature threshold value serving as a determination criterion for determining whether to stop operation (NO in step S11), the notification unit 808 determines whether or not a coil temperature Tc of a certain electromagnetic coil among the electromagnetic coils 501 and 601 has exceeded a second temperature threshold value serving as a determination criterion for determining whether to give a warning (step S13).

In a case where the notification unit 808 determines that a coil temperature Tc of a certain electromagnetic coil among the electromagnetic coils 501 and 601 has exceeded the second temperature threshold value serving as a determination criterion for determining whether to give a warning (YES in step S13), the notification unit 808 outputs a warning indicating that the electromagnetic coil has exceeded the first threshold value (step S14). In addition, the notification unit 808 terminates, the processing. In addition, in a case where a coil temperature Tc of a certain electromagnetic coil among the electromagnetic coils 501 and 601 exceeds the first temperature threshold value serving as a determination criterion for determining whether to give a warning, the notification unit 808 may determine that a load due to an aerodynamic force is an excess load and, for example, may give a notification to the coil current controller 803 so as to reduce an output (the amount of gas discharged), instead of giving a warning.

Further, in a case where the notification unit 808 determines that a coil temperature Tc of a certain electromagnetic coil among the electromagnetic coils 501 and 601 has not exceeded the second temperature threshold value serving as a determination criterion for determining whether to give a warning (NO in step S13), the notification unit 808 terminates the processing.

The processing of the compressor 1 with a magnetic bearing, mounted thereon according to the first embodiment of the present invention has been described above.

In the compressor 1 with a magnetic bearing mounted thereon according to the first embodiment of the present invention, the temperature prediction device 80 includes the coil temperature estimation unit 807. The coil temperature estimation unit 807 estimates temperatures of the electromagnetic coils 501 and 601 on the basis of voltage values related to the electromagnetic coils 501 and 601 based on a distance from the distance detection unit 801 to the output shaft 10, that is, the control voltage Ea generated by the coil voltage adjustment unit 804, current values flowing when voltages are applied to the electromagnetic coils 501 and 601 on the basis of the voltage values, and a relational expression between the voltage values, the current values, and the temperatures of the electromagnetic coils 501 and 601.

In this manner, it is possible to easily determine whether or not an excess current is flowing to the electromagnetic coils 501 and 601 of the compressor 1 with a magnetic bearing mounted thereon. As a result, it is possible to prevent a defect from occurring in the compressor 1 with a magnetic bearing mounted thereon, and thus safe control is performed.

Second Embodiment

A configuration of a compressor 1 with a magnetic bearing mounted thereon according to a second embodiment of the present invention will be described.

In addition, it is assumed that the compressor 1 with a magnetic bearing mounted thereon according to the second embodiment of the present invention is a compressor with a magnetic bearing mounted thereon in which differences between an analog voltage command value for reducing an error current value Ierr generated by a current control arithmetic unit 8032 and control voltages Ea for controlling a coil current Ia generated by a coil voltage adjustment unit 804 are regarded as being small and the same, that is, an analog voltage command value for reducing the error current value Ierr generated by the current control arithmetic unit 8032 is regarded as Ea.

The compressor 1 with a magnetic bearing mounted thereon according to the second embodiment of the present invention includes an output shaft 10, a motor 20, a compressor main body 30, an expander 40, a radial magnetic bearing 50, a thrust magnetic bearing 60, a casing 70, and a temperature prediction device 80, similar to the compressor 1 with a magnetic bearing mounted thereon according to the first embodiment of the present invention shown in FIG. 1.

Figure 4:
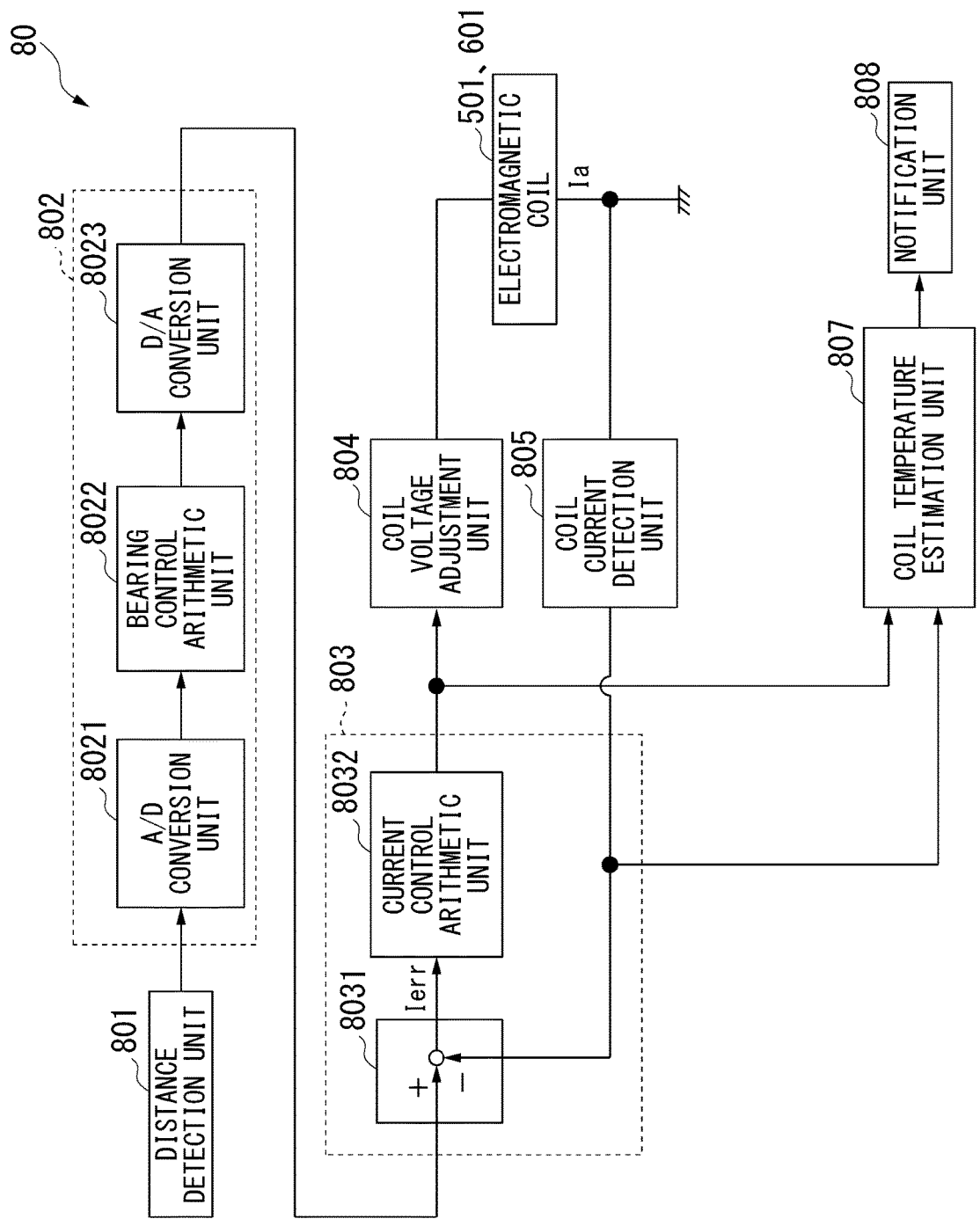
FIG. 4 is a diagram showing a configuration of a temperature prediction device according to a second embodiment of the present invention.

The temperature prediction device 80 includes a distance detection unit 801, a magnetic bearing controller 802, a coil current controller 803, the coil voltage adjustment unit 804, a coil current detection unit 805, a coil temperature estimation unit 807, and a notification unit 808, as shown in FIG. 4.

The coil temperature estimation unit 807 estimates a coil temperature Tc of each of electromagnetic coils 501 and 601 on the basis of a coil current Ia detected by the coil current detection unit 805, an analog voltage command value for reducing an error current value Ierr generated by the current control arithmetic unit 8032 included in the coil current controller 803, and a relational expression indicating a relationship between the coil current Ia, the analog voltage command value for reducing the error current value Ierr, and the coil temperature Tc of each of the electromagnetic coils 501 and 601.

In addition, in the second embodiment of the present invention, as described above, the analog voltage command value for reducing the error current value Ierr generated by the current control arithmetic unit 8032 is regarded as Ea, and thus it is possible to estimate the coil temperature Tc using Expression (3) as a relational expression, similar to the coil temperature estimation unit 807 according to the first embodiment of the present invention.

Next, processing of the compressor 1 with a magnetic bearing mounted thereon according to the second embodiment of the present invention will be described.

Figure 5:
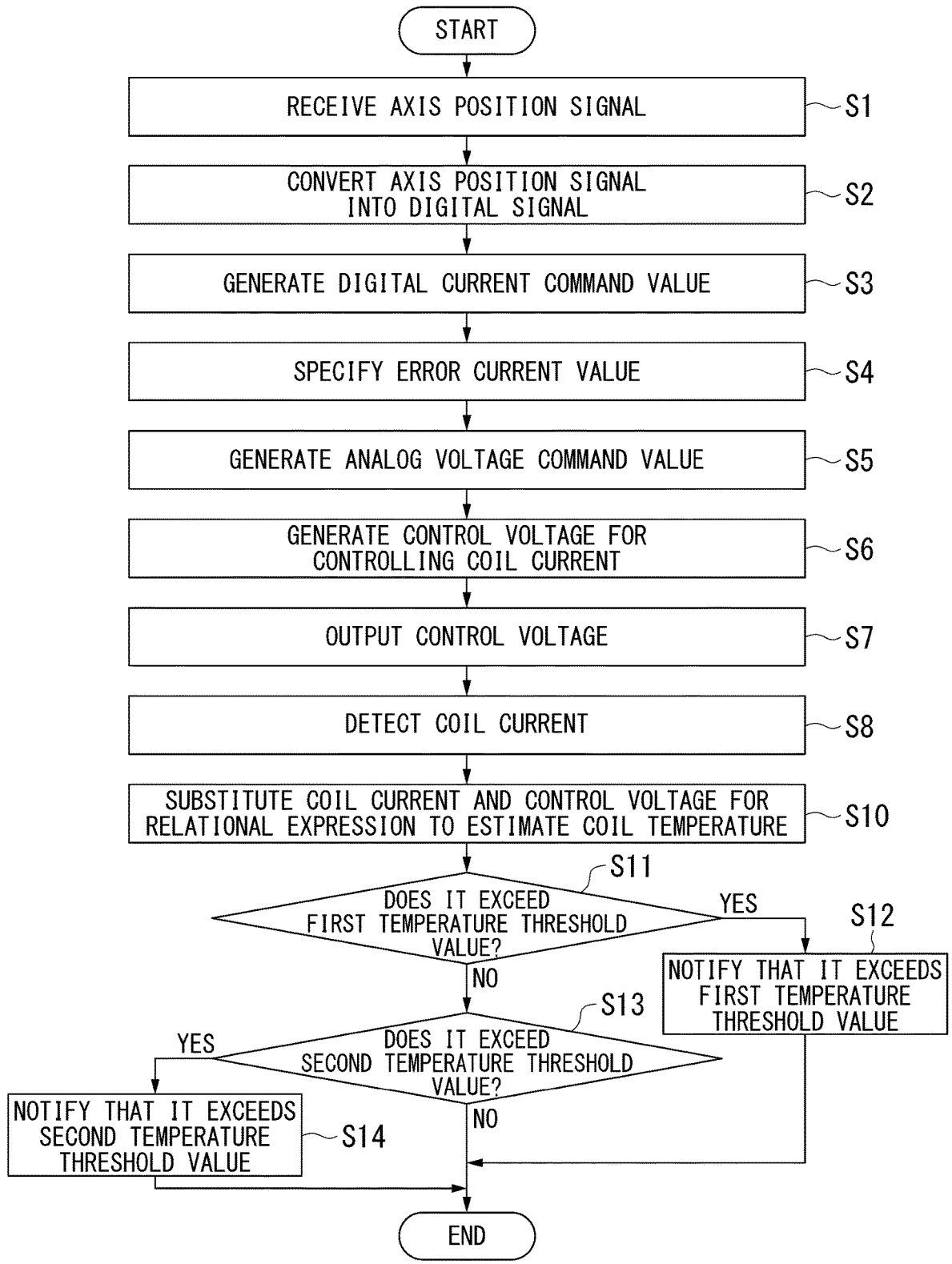
FIG. 5 is a diagram showing a processing flow of a compressor with a magnetic bearing mounted thereon according to the second embodiment of the present invention.
Figure 6:
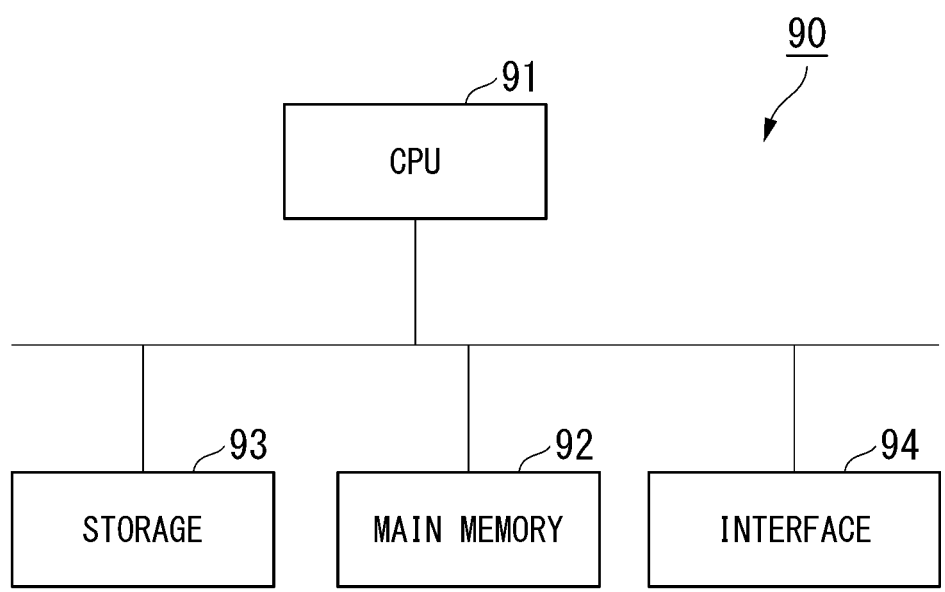
FIG. 6 is a schematic block diagram showing a configuration of a computer according to at least one embodiment.

Here, a processing flow of the temperature prediction device 80 according to the first embodiment of the present invention shown in FIG. 5 will be described.

In addition, here, similarly to the first embodiment of the present invention, the electromagnetic coil 501 shown in FIG. 1 will be described as a specific example. However, the compressor 1 with a magnetic bearing mounted thereon also actually perform the same processing as that of the electromagnetic coil 501 described as a specific example on each of the other electromagnetic coils 501 and 601.

The compressor 1 with a magnetic bearing mounted thereon according to the second embodiment of the present invention performs processes of steps S1 to S4, similar to the compressor 1 with a magnetic bearing mounted thereon according to the first embodiment of the present invention.

A signal synthesis unit 8031 outputs a specified error current value Ieer to the current control arithmetic unit 8032.

The current control arithmetic unit 8032 receives the error current value Ierr from the signal synthesis unit 8031.

The current control arithmetic unit 8032 performs filter arithmetic operation, arithmetic operation for PID control, and the like on the received error current value Ierr to generate an analog voltage command value Ea for reducing an error current value Ierr for each of the electromagnetic coils 501 provided with the distance detection units 801 (step S5).

The current control arithmetic unit 8032 outputs the generated analog voltage command value Ea to the coil voltage adjustment unit 804 and the coil temperature estimation unit 807.

The coil voltage adjustment unit 804 receives the analog voltage command value Ea from the current control arithmetic unit 8032.

The coil voltage adjustment unit 804 switches, that is, turns on or off a switch on the basis of PWM control of the received analog voltage command value Ea to generate a control voltage Ea for controlling a coil current Ia flowing through each of the electromagnetic coils 501 (step S6).

The coil voltage adjustment unit 804 outputs the generated control voltages Ea to the corresponding electromagnetic coils 501, respectively (step S7).

In this case, the coil current Ia based on the corresponding control voltage Ea generated by the coil voltage adjustment unit 804 flows through each of the electromagnetic coils 501.

The coil current detection unit 805 detects the coil current Ia flowing through each of the electromagnetic coils 501 (step S8).

The coil current detection unit 805 outputs a current value of each of the detected coil currents Ia to the coil temperature estimation unit 807.

The coil temperature estimation unit 807 receives the analog voltage command value Ea from the current control arithmetic unit 8032. In addition, the coil temperature estimation unit 807 receives the current value of the coil current Ia from the coil current detection unit 805. In addition, the coil temperature estimation unit 807 reads out Expression (3) which is the above-described relational expression from the storage unit.

The coil temperature estimation unit 807 substitutes the coil current Ia and the analog voltage command value Ea for Expression (3) which is the relational expression read out from the storage unit to estimate a coil temperature Tc (step S10).

The coil temperature estimation unit 807 outputs the estimated value of the coil temperature Tc to the notification unit 808.

The notification unit 808 receives the estimated value of the coil temperature Tc from the coil temperature estimation unit 807.

The notification unit 808 outputs information based on the received estimated value of the coil temperature Tc.

Specifically, for example, the notification unit 808 determines whether or not a coil temperature Tc of a certain electromagnetic coil among the electromagnetic coils 501 and 601 exceeds a first temperature threshold value serving as a determination criterion for determining whether to stop operation (step S11).

In a case where the notification unit 808 determines that a coil temperature Tc of a certain electromagnetic coil among the electromagnetic coils 501 and 601 exceeds the first temperature threshold value serving as a determination criterion for determining whether to stop operation (YES in step S11), the notification unit 808 outputs a warning indicating that the electromagnetic coil exceeds the first threshold value (step S12). In addition, the notification unit 808 terminates the processing. In addition, in a case where the notification unit 808 determines that a coil temperature Tc of a certain electromagnetic coil among the electromagnetic coils 501 and 601 exceeds the first temperature threshold value serving as a determination criterion for determining whether to stop operation (YES in step S11), for example, the notification unit 808 may give a notification to the coil current controller 803 so as to stop the compressor 1 with a magnetic bearing mounted thereon before a defect occurs.

Further, in a case where the notification unit 808 determines that a coil temperature Tc of a certain electromagnetic coil among the electromagnetic coils 501 and 601 does not exceed the first temperature threshold value serving as a determination criterion for determining whether to stop operation (NO in step S11), the notification unit 808 determines whether or not a coil temperature Tc of a certain electromagnetic coil among the electromagnetic coils 501 and 601 exceeds a second temperature threshold value serving as a determination criterion for determining whether to give a warning (step S13).

In a case where the notification unit 808 determines that a coil temperature Tc of a certain electromagnetic coil among the electromagnetic coils 501 and 601 exceeds the second temperature threshold value serving as a determination criterion for determining whether to give a warning (YES in step S13), the notification unit 808 outputs a warning indicating that the electromagnetic coil exceeds the first threshold value (step S14). In addition, the notification unit 808 terminates the processing. In addition, in a case where a coil temperature Tc of a certain electromagnetic coil among the electromagnetic coils 501 and 601 exceeds the first temperature threshold value serving as a determination criterion for determining whether to give a warning, the notification unit 808 may determine that a load due to an aerodynamic force is an excess load and, for example, may give a notification to the coil current controller 803 so as to reduce an output (the amount of gas discharged), instead of giving a warning.

Further, in a case where the notification unit 808 determines that a coil temperature Tc of a certain electromagnetic coil among the electromagnetic coils 501 and 601 does not exceed the second temperature threshold value serving as a determination criterion for determining whether to give a warning (NO in step S13), the notification unit terminates the processing.

The processing of the compressor 1 with a magnetic bearing mounted thereon according to the second embodiment of the present invention has been described above.

In the compressor 1 with a magnetic bearing mounted thereon according to the second embodiment of the present invention; the temperature prediction device 80 includes the coil temperature estimation unit 807. The coil temperature estimation unit 807 estimates temperatures of the electromagnetic coils 501 and 601 on the basis of voltage values related to the electromagnetic coils 501 and 601 based on a distance from the distance detection unit 801 to the output shaft 10, that is, the analog voltage command value Ea generated by the current control arithmetic unit 8032, current values flowing when voltages are applied to the electromagnetic coils 501 and 601 on the basis of the voltage values, and a relational expression between the voltage values, the current values, and the temperatures of the electromagnetic coils 501 and 601.

In this manner, it is possible to easily determine whether or not an excess current is flowing to the electromagnetic coils 501 and 601 of the compressor 1 with a magnetic bearing mounted thereon. As a result, it is possible to previously prevent a defect from occurring in the compressor 1 with a magnetic bearing mounted thereon, and thus safe control is performed.

In addition, a motor 20 according to another embodiment of the present invention may be provided on the outer sides of a compressor main body 30 and an expander 40. That is, for example, the motor 20, the compressor main body 30, and the expander 40 may be provided in this order in an axial direction of an output shaft, or the compressor main body 30, the expander 40, and the motor 20 may be provided in this order.

In addition, in another embodiment of the present invention, a thrust magnetic bearing 60 and an axial rotor disk 101 provided in an output shaft 10 may be provided between the compressor main body 30 and the motor 20.

Although the embodiments of the present invention have been described, the above-described temperature prediction device 80 and the compressor 1 with a magnetic bearing mounted thereon may include, for example, a computer 90 as shown in FIG. 9, therein. In addition, the process of the above-described processing is stored in a computer-readable recording medium (a storage 93) in the format of a program, and a CPU 91 of the computer 90 reads out the program to a main memory 92 and executes the program, whereby the above-described processing is performed. Here, the computer-readable recording medium refers to a magnetism disc, a magneto-optical disc, a CD-ROM, a DVD-ROM, a semiconductor memory, or the like. In addition, the computer program may be distributed to the computer 90 through a communication line, and the computer 90 receiving the computer program may execute the program through an interface 94.

In addition, the program may realize some of the above-described functions.

Further, the above-described program may be a so-called differential file (differential program) capable of realizing the above-described functions in combination with a program which is recorded in the computer 90 in advance.

While some embodiments of the present invention have been described, these embodiments are examples and do not limit the scope of the invention. Various additions, omissions, substitutions, and modifications may be made to these embodiments without departing from the scope of the invention.

INDUSTRIAL APPLICABILITY

According to the temperature prediction devices of the embodiments of the present invention, it is possible to easily determine whether or not an excess current is flowing to an electromagnetic coil of a compressor with a magnetic bearing mounted thereon.

REFERENCE SIGNS LIST

1 Compressor with magnetic bearing mounted thereon
10 Output shaft
20 Motor
30 Compressor main body
40 Expander
50 Radial magnetic bearing
60 Thrust magnetic bearing
70 Casing
80 Temperature prediction device
101 Axial rotor disk
501, 601 Electromagnetic coil
801 Distance detection unit 802 Magnetic bearing controller
803 Coil current controller
804 Coil voltage adjustment unit
805 Coil current detection unit
806 Coil voltage detection unit
807 Coil temperature estimation unit
808 Notification unit

The invention claimed is:

1. A temperature prediction device comprising:
an application voltage specifying unit configured to specify a voltage value applied to an electromagnetic coil based on a distance from a distance detection unit provided in the electromagnetic coil to an output shaft;
a coil current detection unit configured to detect a current value flowing when a voltage is applied to the electromagnetic coil on the basis of the voltage value specified by the application voltage specifying unit;
a coil temperature estimation unit configured to estimate a temperature of the electromagnetic coil on the basis of the voltage value specified by the application voltage specifying unit, the current value detected by the coil current detection unit, and a relational expression between the voltage value applied to the electromagnetic coil, the current value flowing to the electromagnetic coil in accordance with the voltage value applied to the electromagnetic coil, and the temperature of the electromagnetic coil; and
a notification unit configured to receive the estimated value of the temperature of the electromagnet coil from the coil temperature estimation unit, notifies that the estimated value exceeds a threshold value in a case where the estimated value exceeds the threshold value and outputs information based on the estimated value in a case where the estimated value does not exceed the threshold value,
wherein the application voltage specifying unit specifies a measured value or command value of a voltage applied to the electromagnetic coil on the basis of the distance from the distance detection unit provided in the electromagnetic coil to the output shaft,
the coil current detection unit detects a current value flowing when a voltage is applied to the electromagnetic coil on the basis of the measured value of the voltage specified by the application voltage specifying unit, and
the coil temperature estimation unit estimates a temperature of the electromagnetic coil on the basis of the measured value of the voltage specified by the application voltage specifying unit, the current value detected by the coil current detection unit, and the relational expression between the voltage value applied to the electromagnetic coil, the current value flowing to the electromagnetic coil in accordance with the voltage value applied to the electromagnetic coil, and the temperature of the electromagnetic coil.

2. The temperature prediction device according to claim 1, wherein when the voltage value is set to be E, the current value is set to be I, the temperature of the electromagnetic coil is set to be T, a resistance of the electromagnetic coil at a temperature T0 of the electromagnetic coil which is acquired in advance is set to be R0, and a factor is set to be α, the relational expression is an expression expressed as follows.

$$T = T0 + \frac{1}{\alpha}\left(\frac{E}{IR0} - 1\right).$$ [Math. 1]

3. A compressor with a magnetic bearing mounted thereon, the compressor comprising:
the temperature prediction device according to claim 1; and
a motor which includes an electromagnetic coil which is a target for temperature prediction to be performed by the temperature prediction device.

4. A temperature prediction method comprising:
specifying a voltage value applied to an electromagnetic coil based on a distance from a distance detection unit provided in the electromagnetic coil to an output shaft;
detecting a current value flowing when a voltage is applied to the electromagnetic coil on the basis of the specified voltage value;
estimating a temperature of the electromagnetic coil on the basis of the specified voltage value, the detected current value, and a relational expression between the voltage value applied to the electromagnetic coil, the current value flowing to the electromagnetic coil in accordance with the voltage value applied to the electromagnetic coil, and the temperature of the electromagnetic coil;
notifying that the estimated value exceeds a threshold value in a case where the estimated value of the temperature of the electromagnet coil exceeds the threshold value; and
outputting information based on the estimated value in a case where the estimated value does not exceed the threshold value,
wherein the specified voltage is a measured value or command value of a voltage applied to the electromagnetic coil on the basis of the distance from the distance detection unit provided in the electromagnetic coil to the output shaft,
the detected current is a current value flowing when a voltage is applied to the electromagnetic coil on the basis of the measured value of the voltage specified by the application voltage specifying unit, and
the estimated temperature is a temperature of the electromagnetic coil on the basis of the measured value of the specified voltage, the detected current value, and the relational expression between the voltage value applied to the electromagnetic coil, the current value flowing to the electromagnetic coil in accordance with the voltage value applied to the electromagnetic coil, and the temperature of the electromagnetic coil.

5. A non-transitory computer-readable recording medium storing a program causing a computer to:
specify a voltage value applied to an electromagnetic coil based on a distance from a distance detection unit provided in the electromagnetic coil to an output shaft;
detect a current value flowing when a voltage is applied to the electromagnetic coil on the basis of the specified voltage value; and
estimate a temperature of the electromagnetic coil on the basis of the specified voltage value, the detected current value, and a relational expression between the voltage value applied to the electromagnetic coil, the current value flowing to the electromagnetic coil in accordance with the voltage value applied to the electromagnetic coil, and the temperature of the electromagnetic coil;

notifying that the estimated value exceeds a threshold value in a case where the estimated value of the temperature of the electromagnet coil exceeds the threshold value; and outputting information based on the estimated value in a case where the estimated value does not exceed the threshold value, wherein the specified voltage is a measured value or command value of a voltage applied to the electromagnetic coil on the basis of the distance from the distance detection unit provided in the electromagnetic coil to the output shaft, the detected current is a current value flowing when a voltage is applied to the electromagnetic coil on the basis of the measured value of the voltage specified by the application voltage specifying unit, and the estimated temperature is a temperature of the electromagnetic coil on the basis of the measured value of the specified voltage, the detected current value, and the relational expression between the voltage value applied to the electromagnetic coil, the current value flowing to the electromagnetic coil in accordance with the voltage value applied to the electromagnetic coil, and the temperature of the electromagnetic coil.

* * * * *